United States Patent [19]
Reinecke et al.

[11] 3,806,207
[45] Apr. 23, 1974

[54] LOAD PROPORTIONING VALVE

[75] Inventors: Erich Reinecke, Beinhorn; Gunter Seegers, Osterbrink; Heinrich Blase, Bordenau; Karl-Heinz Deike, Schulenburg, all of Germany

[73] Assignee: Westinghouse Bremsen-und Apparatebau GmbH, Hannover, Germany

[22] Filed: Sept. 1, 1972

[21] Appl. No.: 285,555

[30] Foreign Application Priority Data
Jan. 12, 1972 Germany.......................... 2201181

[52] U.S. Cl................ 303/22 R, 188/195, 303/6 C, 303/84 A
[51] Int. Cl............................................. B60t 8/18
[58] Field of Search.......... 303/22 R, 22 A, 23 R, 6, 303/13, 84; 188/195

[56]  References Cited
UNITED STATES PATENTS
3,731,981  5/1973  Bueler.............................. 303/22 R
3,410,609  11/1968  Biaband........................... 303/22 R
3,442,557  5/1969  Oberthur.......................... 303/22 R

*Primary Examiner*—Duane A. Reger
*Assistant Examiner*—D. C. Butler
*Attorney, Agent, or Firm*—W. F. Poore; R. W. McIntire, Jr.

[57]  ABSTRACT

This invention relates to a brake pressure regulator having a pair of shut-off valves one of which regulates the pressure in a brake cylinder for the rear wheels of a vehicle in accordance with the load carried by the vehicle, and the other of which operates to limit the pressure in a brake cylinder for the front wheels to a chosen value in excess of the pressure in the rear brake cylinder.

3 Claims, 1 Drawing Figure

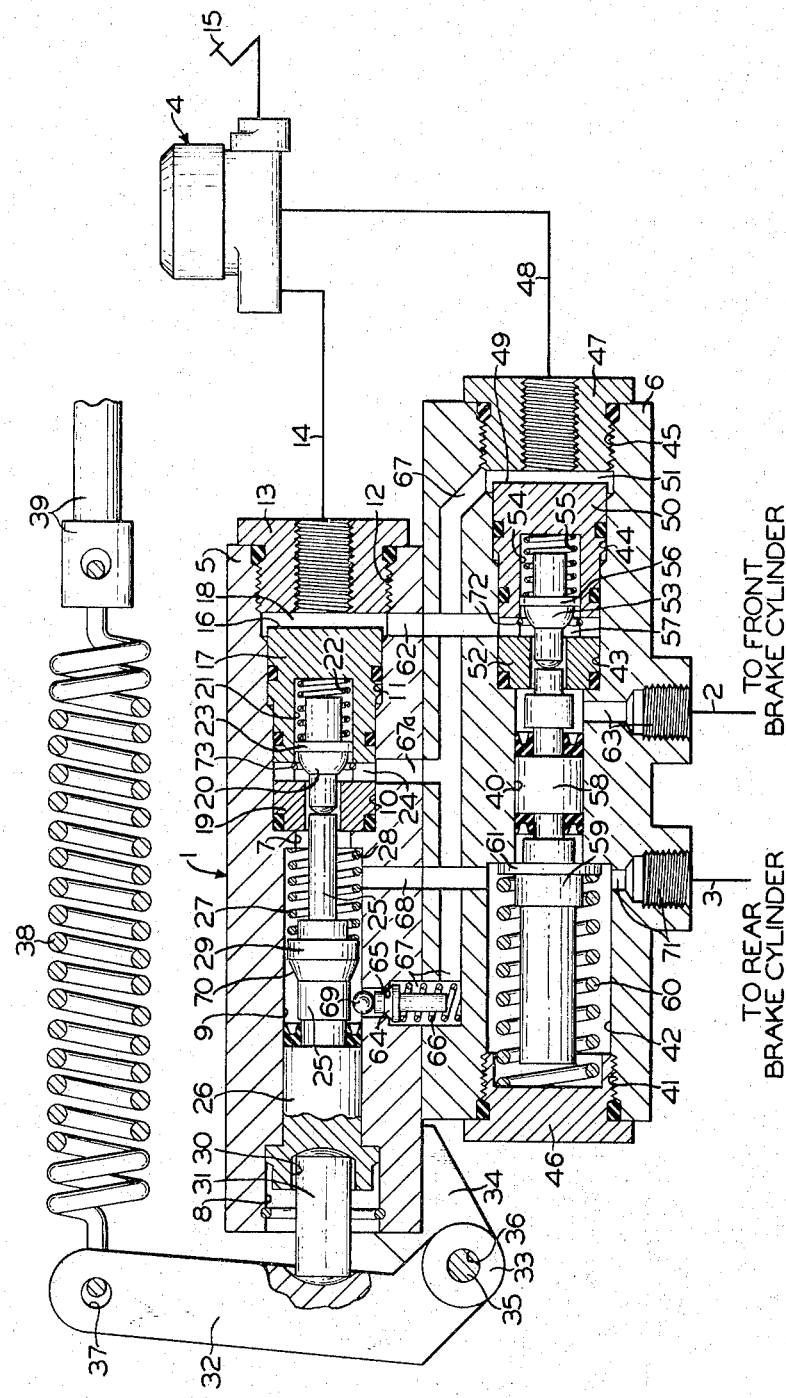

LOAD PROPORTIONING VALVE

BACKGROUND OF THE INVENTION

When a rupture in one conduit connected to a conventional type brake pressure regulator occurs, thereafter only a limited degree of braking force may be obtained which is not sufficient to properly brake the vehicle and bring it to a stop within a reasonable minimum of time and distance.

SUMMARY OF THE INVENTION

According to the present invention, there is provided for a dual-type brake apparatus a novel brake pressure regulator that is operative, upon the rupture of one of two fluid pressure supply conduits connecting the regulator to a dual-type master cylinder, to effect a supply of fluid under pressure to the opposite delivery conduit whereby a brake application is effected on the wheels carried on at least one axle of a vehicle. This novel brake pressure regulator comprises a pair of shut-off valves, the supply chambers of which are formed by the cooperative relationship of the wall surface of the respective one of a pair of stepped bores with one end of a fixed annular valve seat disposed within this bore and one end of a cup-shaped piston member slidably mounted therein, the opposite end of this member being subject to fluid under pressure in the supply communication to the other shut-off valve. Accordingly, either shut-off valve of this brake pressure regulator is operative in response to a loss of pressure in the supply communication to the other shut-off valve to effect the supply of fluid under pressure to the corresponding delivery conduit until the pressure therein is increased to that in the supply communication to the one shut-off valve.

The operation of the shut-off valve controlling flow of fluid under pressure to the delivery conduit for the rear brakes is controlled by a piston, one side of which is subject to a force proportional to the load on the vehicle, the opposite side being subject to the fluid supplied past this shut-off valve whereby the rear brake pressure is varied in accordance with the load. Moreover, an emergency valve device is operable by this piston upon failure or breakage of a load-weighing mechanism to establish a communication between supply and delivery conduits for a rear brake cylinder in by-pass relation to the shut-off valve for this brake cylinder whereby the pressure in this rear brake cylinder delivery conduit is increased to that in the corresponding supply conduit. Accordingly, a fluid pressure brake system that embodies therein the novel brake pressure regulator constituting the present invention is provided with increased operational reliability.

As shown in the drawing, a dual-type hydraulic brake apparatus embodying the invention comprises a brake pressure regulator 1 through which fluid under pressure may be supplied to front and rear brake cylinder conduits 2 and 3 from a manually operated dual master cylinder 4 which may be of any suitable commercially available type.

A sectionalized casing of the brake pressure regulator 1 comprises an upper casing section 5 and a lower casing section 6 secured thereto by any suitable means (not shown). The upper casing section 5 is provided with a bore 7 and five coaxial counterbores two of which extend inward from the left-hand end of this casing section and are denoted by the reference numerals 8 and 9. The remaining three coaxial counterbores extend inward from the right-hand end of this upper casing section 5 and are denoted by the reference numerals 10, 11, and 12, the outer end of counterbore 12 being provided with internal screw threads to receive an annular screw-threaded plug 13. This plug 13 is provided with internal screw threads for receiving the screw-threaded one end of a front brake supply conduit or pipe 14 that has its other end connected to the dual master cylinder 4 so that the primary piston (not shown) of this cylinder 4 is effective to cause an increase in the pressure of the fluid in this pipe 14 whenever an operator exerts a brake applying force on a pedal 15 of the dual master cylinder 4.

The left-hand end of the plug 13 in cooperation with the wall surface of counterbore 12 and a face 16 on the right-hand end of a first differential type piston 17 sealably and slidably mounted in the counterbores 10 and 11 form a first pressure chamber 18 that is filled with fluid, the pressure of which varies in accordance with the manual force applied to the pedal 15 by the operator of the vehicle.

Press-fitted into the left-hand end of the counterbore 10 is an annular valve seat member 19 for receiving the stem of a first poppet-type shut-off valve 20 that is slidably disposed in a bottomed bore 21 provided in the left-hand end of the piston 17 and biased in the direction of this valve seat member 19 by a spring 22 that is interposed between the end of the bottomed bore 21 and a spring seat 23 formed integral with the valve 20, it being noted that the outer periphery of this spring seat 23 is fluted to provide for the flow of fluid under pressure into the bottomed bore 21 from a supply chamber 24 formed between the right-hand end of annular valve seat member 19 and the spring seat 23.

As shown in the drawing, the valve 20 is held unseated or open by the right-hand end of a stem 25 that is integral with a piston 26 slidably and sealably mounted in the counterbore 9 against the combined biasing forces of the above-mentioned spring 22 and a spring 27 that is disposed about the stem 25 and interposed between a shoulder 28 formed by the right-hand end of the counterbore 9 and a spring seat 29 integral with the stem 25 intermediate the ends thereof. The left-hand end of the piston 26 is provided with a bottomed bore 30 in which is disposed the right-hand end of a pin 31, the opposite end of which abuts a lever 32 of a load-measuring mechanism now to be described.

Each side of the lower end of lever 32 is provided with a boss 33 whereby this lever is pivotally mounted between the jaws of a clevis 34 integral with the upper casing section 5 by means of a pin 35 that extends through coaxial bores 36 in the bosses 33 and the jaws of the clevis 34, it being noted that only one of these jaws is shown in the drawing.

As can be seen from the drawing, the upper end of the lever 32 is provided with a bore 37 for receiving a hook at one end of a tension-type spring 38, the opposite end of which is also provided with a hook by which this spring is connected to a link 39 that is positioned according to the load on the vehicle by any suitable means (not shown) whereby the tension of the spring 38 is increased as the load on the vehicle is increased.

As shown in the drawing, the lower casing section 6 is provided with a bore 40 and five coaxial counterbores, two of which extend inward from the left-hand end of this casing section and are denoted by the reference numerals 41 and 42. The remaining three coaxial counterbores extend inward from the right-hand end of the lower casing section 6 and are denoted by the reference numerals 43, 44 and 45. The outer end of the counterbores 41 and 45 are provided with internal screw threads for receiving respectively screw-threaded plugs 46 and 47. The plug 47 is provided with internal screw threads for receiving the screw-threaded one end of a rear brake supply conduit or pipe 48 that has its other end connected to the dual master cylinder 4 so that the secondary piston (not shown) of this cylinder 4 is effective to cause an increase in the pressure of the fluid in this pipe 48 whenever the operator exerts a brake applying force on the pedal 15.

The left-hand end of the plug 47 in cooperation with the wall surface of counterbore 45 and a face 49 on the right-hand end of a second differential type piston 50 sealably and slidably mounted in the counterbores 43 and 44 form a second pressure chamber 51. This chamber 51 is filled with fluid, the pressure of which varies in accordance with the manual force applied to the pedal 15.

Press-fitted into the left-hand end of the counterbore 43 is an annular valve seat member 52 that receives therein the stem of a second poppet-type shut-off valve 53 that is slidably disposed in a bottomed bore 54 provided in the left-hand end of the piston 50. This valve 53 is biased in the direction of the seat member 52 by a spring 55 that is interposed between the end of the bottomed bore 54 and a spring seat 56 that is formed integral with the valve 53, it being noted that the outer periphery of this valve seat 56 is fluted to provide for the flow of fluid under pressure into the bottomed bore 54 from a supply chamber 57 formed between the right-hand end of annular valve seat member 52 and the spring seat 56.

Sealably and slidably mounted in the bore 40 is a piston 58 that has integral therewith at each end thereof a stem, the end of one of which stems abuts a spring seat 59. Disposed within the counterbore 42 and interposed between the plug 46 and the spring seat 59 is a spring 60 that is normally effective to bias a flange 61 integral with the spring seat 59 against the right-hand end of the counterbore 42 and the piston 58 to the position shown. In this position of piston 58, the stem integral with the right-hand end of this piston abuts the stem of the shut-off valve 53 to maintain this valve unseated so that a communication is established between the supply chamber 57 that is connected to the first pressure chamber 18 via a passageway 62 extending through the casing sections 5 and 6 and the front brake cylinder conduit 2 via annular valve seat member 52, bore 40 and a delivery passageway 63 provided in the casing section 6 to one end of which passageway the conduit 2 is connected, it being noted that the opposite end of this passageway opens into the bore 40.

The brake pressure regulator 1 further comprises an emergency valve 64 that is normally seated on a valve seat 65 by a spring 66 to close communication between a supply passageway 67 extending through the casing sections 5 and 6 and opening at one end into the pressure chamber 51 and having a branch passageway 67a opening into the supply chamber 24, and the interior of the counterbore 9. Opening into the counterbore 9 is one end of a passageway 68 that extends through the casing sections 5 and 6 and at its other end opens into the counterbore 42. The emergency valve 64 is adapted to be unseated from seat 65 when a ball element 69 that rests on the upper end of this valve is engaged by a cam surface 70 formed on the spring seat 29 upon movement of this spring seat and the piston 26 in the direction of the left hand by the spring 27 should the spring 38 or link 39 break.

Operation

While the brakes are released, the parts of the brake pressure regulator 1 occupy the position shown in the drawing, it being understood that the passageways therein as well as the pipes or conduits 2, 3, 14, and 48 are filled with a suitable non-compressable hydraulic fluid.

It will be noted that the spring 38, the tension of which is varied according to the load on the vehicle, is effective via lever 32, pin 31, piston 26 and stem 25 to hold shut-off valve 20 unseated.

Moreover, it is apparent from the drawing that the spring 60 is effective to bias the flange 61 against the right-hand end of the counterbore 42 so that the piston 58 maintains the shut-off valve 53 unseated, as hereinbefore stated.

When a brake application is effected by the operator of the vehicle depressing the pedal 15 of the dual master cylinder 4, the pressure of the fluid in all the brake cylinders is increased simultaneously. Accordingly, pressure is transmitted from the dual master cylinder 4 to the front brake cylinder (not shown) via front supply pipe 14, pressure chamber 18, passageway 62, supply chamber 57, past unseated valve 53, annular valve seat member 52, bore 40, passageway 63 and conduit 2. Likewise, pressure is transmitted from the dual master cylinder 4 to the rear brake cylinder (not shown) via rear supply pipe 48, pressure chamber 51, passageway 67, branch passageway 67a, chamber 24, past unseated valve 20, annular valve seat member 19, bore 7, counterbore 9, passageway 68, counterbore 42, a passageway 71 in the casing section 6 and conduit 3, one end of which is connected to the exterior end of the passageway 71 and the opposite end to the rear brake cylinder.

Upon the pressure in the counterbore 9 and the rear brake cylinder increasing to such a value that this fluid pressure force together with the force of the spring 27 exceeds the force exerted by the load weighing spring 38 on the piston 26 via lever 32 and pin 31, this piston 26 will be moved in the direction of the left hand until the spring 22 seats shut-off valve 20 on annular valve seat member 19 thus preventing a further increase of pressure in the rear brake cylinder and slipping of the rear wheels of the vehicle.

The pressure in the front brake cylinder and acting on the right-hand end of the piston 58 will continue to increase until the fluid pressure force acting on the right-hand end of piston 58 exceeds the force of the spring 60 and the fluid pressure force acting on the left-hand end of this piston, it being understood that this left-hand end of piston 58 is subject to the pressure of the fluid in the counterbore 42 and in the rear brake cylinder. Upon the force acting on the right-hand end of piston 58 exceeding that on the left-hand end and the force of spring 60, this piston 58 will be moved in the direction of the left hand whereupon the spring 55 is rendered effective to seat shut-off valve 53 on annular valve seat member 52. Consequently, it is apparent that the pressure in the front brake cylinder exceeds the pressure obtained in the rear brake cylinder by an amount dependent upon the strength of the spring 60.

Now should the pipe 48 rupture, as the result of vibration, rubbing against another member or rust after prolonged use, while a brake application is in effect, the pressure on the face 49 of differential type piston 50 is reduced to atmospheric pressure. At this time the pressure supplied to the chamber 18 via the pipe 14 maintains the differential type piston 17 in the position in which the spring 22 is able to maintain valve 20 in its closed position. Since the chamber 18 is connected to the chamber 57 via the passageway 62, it is apparent that upon the loss of pressure on the face 49 of the piston 50, fluid under pressure present in the chamber 57 is rendered effective to shift this piston 50 in the direction of the right hand. It will be noted from the drawing that the wall surface of the bottomed bore 54 is provided with a groove in which is inserted a snap ring 72. Consequently, as the piston 50 is shifted in the direction of the right hand by the fluid under pressure present in the chamber 57, the snap ring 72 is moved into contact with the spring seat 56 and thereafter, as the piston 50 continues to be shifted in the direction of the right hand, effects unseating of the valve 53 from the annular valve seat member 52.

With the valve 53 thus unseated, a higher pressure will be established in the front brake cylinder, it being understood that the degree of pressure thus established in the front brake cylinder is dependent upon the force applied by the operator to the pedal 15 or, in other words, the pressure of the fluid in the pipe 14 which pressure of course is dependent upon the force applied to the pedal 15.

If the pipe 14 should rupture, as the result of vibration, rubbing against another member or rust after prolonged use, while a brake application is in effect, the pressure on the face 16 of the differential type piston 17 will be immediately reduced to atmospheric pressure. Consequently, the spring 38 is rendered effective via lever 32 and pin 31 to shift piston 26 and stem 25 in the direction of the right hand so that the stem 25 unseats shut-off valve 20 from annular valve seat member 19.

Furthermore, upon the reduction of pressure in the chamber 18 to atmospheric pressure, the fluid under pressure supplied to the chamber 24 from the pipe 48 via chamber 51, passageway 67 and branch passageway 67a is rendered effective to shift the piston 17 in the direction of the right hand. It will be seen from the drawing that the wall surface of the bottomed bore 21 in the piston 17 is provided with a groove in which is inserted a snap ring 73. Therefore, as this position 17 is shifted in the direction of the right hand by the fluid under pressure present in the chamber 24, this snap ring 73 is effective to first contact the spring seat 23 so that thereafter shut-off valve 20 and piston 17 are moved simultaneously in the direction of the right hand until face 16 on piston 17 abuts plug 13.

upon unseating of the valve 20, a higher pressure will be established in the rear brake cylinder, for it will be understood that this pressure will increase to that in the pipe 48 which pressure is dependent upon the degree of force applied to the pedal 15 at this time.

In the event that the lever 32, spring 38 or link 39 fails or breaks while the brakes are released, the spring 27 will shift piston 26 and stem 25 in the direction of the left hand, as viewed in the drawing, thereby rendering spring 22 effective to seat shut-off valve 20 on annular valve seat member 19. As piston 26 and stem 25 are thus shifted in the direction of the left hand, it can be seen from the drawing that the cam surface 70 on spring seat 29 is moved against a ball element 69 which is thereafter forced to move downward and effect unseating of the emergency valve 64 from its seat 65.

If now the operator depresses pedal 15, the pressure in the rear brake cylinder will be increased since a communication is now open between the pipe 48 and the conduit 3 connected to the rear brake cylinder via chamber 51, passageway 67, past now unseated emergency valve 64, counterbore 9, passageway 68, counterbore 42 and passageway 71. It will be noted that this communication is in by-pass relation to the now closed shut-off valve 20.

The increase of the pressure in the counterbore 42 is effective on the left-hand end of the piston 58 to shift this piston in the bore 40 in the direction of the right hand. As piston 58 is thus shifted in the direction of the right hand, the stem integral with the right-hand end thereof effects unseating of the valve 53 from annular valve seat member 52.

Upon the unseating of the valve 53, a communication is established between the pipe 14 and the conduit 2 via chamber 18, passageway 62, chamber 57, past now unseated valve 53, annular valve seat member 52, bore 40 and passageway 63. The pressure in the front brake cylinder will now increase until it is the same as the pressure in the pipe 14, it being understood that the pressure in the pipe 14 is dependent upon the degree of force applied to the pedal 15.

Having now described the invention, what we claim as new and desire to secure by letters patent, is:

1. In a vehicle dual-type hydraulic brake apparatus having a dual master cylinder connected by a pair of conduits to respective front and rear brake cylinders, a brake cylinder pressure regulator comprising:
   a. a pair of shut-off valve devices each disposed in a separate one of the pair of conduits and each comprising:
      i. a stationary valve seat member,
      ii. a shut-off valve cooperative with said valve seat member to control the pressure established in one of said brake cylinders,
      iii. a movable abutment subject to the pressure established by the dual master cylinder in the other of the pair of conduits,
      iv. mechanical means carried by said abutment for effecting opening of said shut-off valve in response to loss of pressure in the other conduit to cause the establishment of a pressure in one of said brake cylinders that is equal to that established in said one conduit by the master cylinder, and
   b. means controlling the opening and closing of the shut-off valve of one of said pair of shut-off valve devices in accordance with the load carried by the vehicle.

2. A vehicle dual-type hydraulic brake apparatus, as recited in claim 1, further characterized in that said movable abutment comprises a differential type piston having therein a bottomed bore, and in that said shut-off valve comprises a poppet-type valve having integral therewith a fluted spring seat that is slidably disposed in said bottomed bore and has a stem extending therefrom in a direction opposite that of said valve for encirclement by a spring interposed between said spring seat and the end of said bottomed bore whereby said spring in cooperation with fluid under pressure supplied past said fluted spring seat is effective to bias said valve against said mechanical means upon loss of pressure in the other conduit.

3. A vehicle dual-type hydraulic brake apparatus, as recited in claim 1, further characterized by an emergency valve operable by one of said shut-off valves, and by a load-weighing mechanism comprising biasing means the rupture of which is effective to cause said one shut-off valve to close and to effect opening of said emergency valve whereby manual operation of the master cylinder subsequent to the opening of said emergency valve effects the supply of fluid under pressure to both of said brake cylinders notwithstanding closure of said one shut-off valve.

* * * * *